No. 871,287.
PATENTED NOV. 19, 1907.
H. L. MENDAL.
FRYING PAN.
APPLICATION FILED JULY 1, 1907.
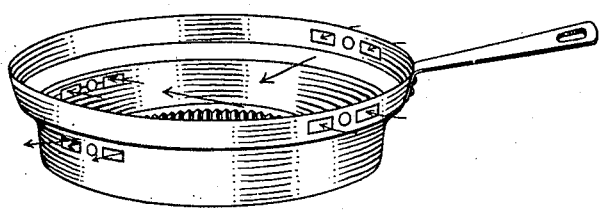
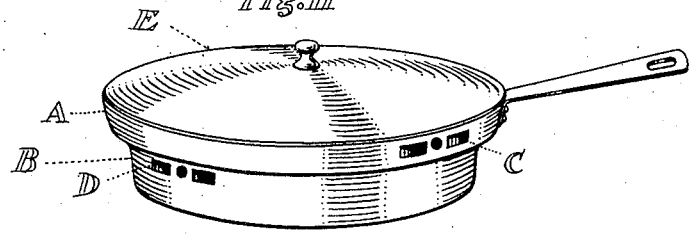
WITNESSES:
Floyd H. Gill
R. M. Jones
INVENTOR.
Henry Lloyd Mendal

UNITED STATES PATENT OFFICE.

HENRY LLOYD MENDAL, OF CINCINNATI, OHIO.

FRYING-PAN.

No. 871,287.  Specification of Letters Patent.  Patented Nov. 19, 1907.

Application filed July 1, 1907. Serial No. 381,704.

To all whom it may concern:

Be it known that I, HENRY LLOYD MENDAL, a citizen of the United States, residing at 414 West Eighth street, Cincinnati, county of Hamilton, State of Ohio, have invented a new and useful Frying-Pan, of which the following is a specification.

My invention relates to frying pans or broilers.

My device consists in a frying pan or vessel for the purpose of cooking meats fish or any substance in a pan or utensil so constructed as to force the smoke, steam, or odor from the substance (while in the process of cooking) into the flue of the chimney.

I attain this object by the utensil illustrated in the accompanying drawing. The same showing a frying-pan or broiler with close corrugated or plain bottom provided with a cover for top of utensil.

Figure (1) in drawing shows the pan without cover Fig. (2) shows the pan covered.

The following description with letters from A. to E. inclusive relate to similar letters in drawing. A. being upper part of utensil, B. the lower part of the same. C. apertures in upper part of utensil, and D. apertures in lower part of utensil.

The apertures C, are for the purpose of allowing a current of air to enter utensil. Apertures D. are for the purpose of allowing smoke, steam, or odor to escape into the fire-box of stove. E. the cover prevents smoke or steam rising from the vessel.

The operation is as follows:—As the vessel is placed over fire of stove, the lower part of vessel marked B. is let down in fire-box of stove. The upper part of vessel marked A. remains above the top of stove. The cover E. being placed over top of vessel when in use. As soon as the cover is in place the draft of the chimney will force a continuous circulation of air through the vessel, taking in air through the apertures marked C. passing out through the apertures marked D. into the fire-box of the stove thence into the flue of the chimney.

What I claim as my invention and desire to secure as Letters Patent is:—

In a covered frying pan a body part provided with a projecting flange and adapted to fit into the fire box of the stove, a rim projecting upwardly from said flange, apertures in the rim, and other apertures in the body portion opening into the fire box, the apertures in the rim and body being placed opposite to each other as for the purposes set forth.

HENRY LLOYD MENDAL.

Witnesses:
JOSEPH SCHULTZ,
J. M. FROHMAN.